US009388550B2

(12) United States Patent
Wei et al.

(10) Patent No.: US 9,388,550 B2
(45) Date of Patent: Jul. 12, 2016

(54) SYSTEM AND METHOD FOR CONTROLLING THE OPERATION OF A MACHINE

(71) Applicant: Caterpillar Inc., Peoria, IL (US)

(72) Inventors: Mo Wei, Dunlap, IL (US); Michael Taylor, Swissvale, PA (US); Thandava K. Edara, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 137 days.

(21) Appl. No.: 14/484,651

(22) Filed: Sep. 12, 2014

(65) Prior Publication Data

US 2016/0076223 A1    Mar. 17, 2016

(51) Int. Cl.
*E02F 9/20* (2006.01)
*E02F 3/43* (2006.01)
*E02F 9/26* (2006.01)
*E01C 19/00* (2006.01)
*E02F 3/84* (2006.01)
*G05D 1/02* (2006.01)

(52) U.S. Cl.
CPC .............. *E02F 9/2029* (2013.01); *E01C 19/004* (2013.01); *E02F 3/43* (2013.01); *E02F 3/435* (2013.01); *E02F 3/845* (2013.01); *E02F 9/205* (2013.01); *E02F 9/2041* (2013.01); *E02F 9/2045* (2013.01); *E02F 9/262* (2013.01); *G05D 1/021* (2013.01); *G05D 1/0274* (2013.01); *G05D 1/0278* (2013.01)

(58) Field of Classification Search
CPC .............. E02F 3/43; E02F 3/435; E02F 3/845; E02F 9/262; E02F 9/2045; E02F 9/205; G05D 1/021; G05D 1/0274; G05D 1/0278; E01C 19/004

USPC ............................................................ 701/50
See application file for complete search history.

(56) References Cited

U.S. PATENT DOCUMENTS

| 5,005,652 | A | * | 4/1991 | Johnson .................. E02F 3/847 172/1 |
| 5,551,524 | A | | 9/1996 | Yamamoto et al. |
| 5,631,658 | A | * | 5/1997 | Gudat .................. A01B 79/005 342/357.31 |
| 5,646,844 | A | * | 7/1997 | Gudat .................... E01C 19/004 701/409 |
| 5,864,970 | A | | 2/1999 | Maddock et al. |
| 5,924,493 | A | * | 7/1999 | Hartman ................. E02F 3/431 172/4.5 |
| 5,996,703 | A | * | 12/1999 | Yamamoto ............. E02F 3/845 172/4.5 |
| 6,076,029 | A | * | 6/2000 | Watanabe ............... E02F 3/437 172/4 |

(Continued)

OTHER PUBLICATIONS

U.S. Appl. No. 14/484,694, filed Sep. 12, 2014.

(Continued)

*Primary Examiner* — Thomas G Black
*Assistant Examiner* — Sze-Hon Kong
(74) *Attorney, Agent, or Firm* — Leydig, Voit & Mayer, Ltd.

(57) ABSTRACT

A system for autonomous control of a machine having a ground-engaging work implement includes a position sensor and a controller. The controller is configured to determine the position of a work surface based upon the position signals and select a work zone loading profile for a work zone cut location along a path within a work zone and the work zone loading profile has a work zone cut angle relative to a ground reference. The controller is further configured to select a final cut loading profile for a final cut location along the path adjacent the boundary zone with the final cut loading profile having a final cut angle relative to the ground reference. The final cut angle is steeper than the work zone cut angle.

20 Claims, 8 Drawing Sheets

(56) References Cited

U.S. PATENT DOCUMENTS

| | | | |
|---|---|---|---|
| 6,167,336 A | 12/2000 | Singh et al. | |
| 6,351,697 B1 * | 2/2002 | Baker | G01G 23/3728 342/357.24 |
| 6,445,310 B1 | 9/2002 | Bateman et al. | |
| 6,823,616 B1 * | 11/2004 | Gutter | E02F 1/00 294/68.23 |
| 6,845,311 B1 | 1/2005 | Stratton et al. | |
| 7,216,033 B2 | 5/2007 | Flann et al. | |
| 7,513,070 B2 * | 4/2009 | Ogura | E02F 9/26 172/2 |
| 7,578,079 B2 | 8/2009 | Furem | |
| 7,734,398 B2 | 6/2010 | Manneppalli | |
| 7,979,175 B2 | 7/2011 | Allard et al. | |
| 8,073,584 B2 | 12/2011 | Marty et al. | |
| 8,139,108 B2 | 3/2012 | Stratton et al. | |
| 8,351,684 B2 | 1/2013 | Clar et al. | |
| 8,456,327 B2 | 6/2013 | Bechtel et al. | |
| 8,620,535 B2 | 12/2013 | Friend et al. | |
| 8,639,393 B2 | 1/2014 | Taylor et al. | |
| 2002/0162668 A1 * | 11/2002 | Carlson | E02F 3/847 172/4.5 |
| 2007/0129869 A1 * | 6/2007 | Gudat | G05D 1/0297 701/50 |
| 2008/0082238 A1 * | 4/2008 | Manneppalli | E02F 9/2045 701/50 |
| 2008/0180523 A1 | 7/2008 | Stratton et al. | |
| 2009/0043462 A1 | 2/2009 | Stratton et al. | |
| 2009/0202109 A1 | 8/2009 | Clar et al. | |
| 2009/0256860 A1 * | 10/2009 | Nichols | G06T 19/00 345/632 |
| 2010/0250023 A1 | 9/2010 | Gudat | |
| 2010/0299031 A1 * | 11/2010 | Zhdanov | E02F 3/845 701/50 |
| 2011/0093171 A1 | 4/2011 | Saposnik | |
| 2012/0016557 A1 * | 1/2012 | Verboomen | E02F 3/907 701/50 |
| 2012/0089293 A1 | 4/2012 | Halder et al. | |
| 2012/0136508 A1 | 5/2012 | Taylor et al. | |
| 2012/0139325 A1 | 6/2012 | Norberg et al. | |
| 2012/0154572 A1 | 6/2012 | Stratton et al. | |
| 2012/0215378 A1 | 8/2012 | Sprock et al. | |
| 2012/0275893 A1 * | 11/2012 | Colwell | E02F 3/46 414/685 |
| 2013/0006484 A1 * | 1/2013 | Avitzur | E02F 9/205 701/50 |
| 2013/0085645 A1 * | 4/2013 | Hayashi | E02F 3/7618 701/50 |
| 2013/0087350 A1 * | 4/2013 | Hayashi | E02F 9/2029 172/2 |
| 2014/0012404 A1 | 1/2014 | Taylor et al. | |
| 2014/0032030 A1 | 1/2014 | Stratton et al. | |
| 2014/0032058 A1 | 1/2014 | Stratton et al. | |
| 2014/0032132 A1 | 1/2014 | Stratton et al. | |
| 2014/0257646 A1 * | 9/2014 | Ishibashi | E02F 3/844 701/50 |
| 2015/0218781 A1 * | 8/2015 | Nomura | E02F 3/435 701/50 |
| 2015/0308081 A1 * | 10/2015 | Takaura | E02F 3/437 701/50 |
| 2015/0308082 A1 * | 10/2015 | Takaura | E02F 9/2029 701/50 |
| 2016/0040388 A1 * | 2/2016 | Kontz | E02F 9/2045 701/50 |
| 2016/0040397 A1 * | 2/2016 | Kontz | E02F 9/262 701/400 |

OTHER PUBLICATIONS

U.S. Appl. No. 14/484,710, filed Sep. 12, 2014.
U.S. Appl. No. 14/484,548, filed Sep. 12, 2014.
U.S. Appl. No. 14/484,720, filed Sep. 12, 2014.
U.S. Appl. No. 14/484,601, filed Sep. 12, 2014.
U.S. Appl. No. 14/484,549, filed Sep. 12, 2014.
U.S. Appl. No. 14/484,735, filed Sep. 12, 2014.
U.S. Appl. No. 14/484,586, filed Sep. 12, 2014.

* cited by examiner

SYSTEM AND METHOD FOR CONTROLLING THE OPERATION OF A MACHINE

TECHNICAL FIELD

This disclosure relates generally to controlling a machine and, more particularly, to a system and method for analyzing physical characteristics of a work surface and providing operating commands upon the physical characteristics meeting one or more thresholds.

BACKGROUND

Machines such as dozers, motor graders, wheel loaders, etc., are used to perform a variety of tasks. For example, these machines may be used to move material at a work site. The machines may operate in an autonomous, semi-autonomous, or manual manner to perform these tasks in response to commands generated as part of a work plan for the machines. The machines may receive instructions in accordance with the work plan to perform operations including digging, loosening, carrying, etc., different materials at the work site such as those related to mining, earthmoving and other industrial activities.

When performing material moving operations, it may be difficult to move material near a boundary such as a high wall with a dozer. Operation near the boundary may become particularly problematic when the dozers are operating autonomously. Accordingly, it may be desirable to alter the autonomous operation near the boundary.

U.S. Patent Publication No. 2007/0129869 discloses a system for automated control of a plurality of machines at a work site. The machines may received instructions from a controller and perform certain tasks to move material or otherwise alter the topography of the work site. More than one machine may work in tandem to perform certain tasks.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for autonomous control of a machine having a ground-engaging work implement includes a position sensor for generating position signals indicative of a position of a work surface at a work site and a controller. The controller is configured to store an electronic map of the work site having a boundary, a work zone, and a boundary zone between the boundary and the work zone, store a target surface, and determine the position of the work surface based upon the position signals. The controller is further configured to select a work zone loading profile for a work zone cut location along the path within the work zone, the work zone loading profile having a work zone cut angle relative to a ground reference and select a final cut loading profile for a final cut location along the path adjacent the boundary zone, the final cut loading profile having a final cut angle relative to the ground reference, the final cut angle being steeper than the work zone cut angle.

In another aspect, a controller-implemented method for autonomous control of a machine having a ground-engaging work implement includes storing an electronic map of a the work site having a boundary, a work zone, and a boundary zone between the boundary and the work zone, storing a target surface, and determining a position of the work surface based upon position signals from a position sensor. The method further includes selecting a work zone loading profile for a work zone cut location along the path within the work zone, the work zone loading profile having a work zone cut angle relative to a ground reference and selecting a final cut loading profile for a final cut location along the path adjacent the boundary zone, the final cut loading profile having a final cut angle relative to the ground reference, the final cut angle being steeper than the work zone cut angle.

In still another aspect a machine includes a prime mover, a ground-engaging work implement for engaging a work surface along a path at a work site, a position sensor for generating position signals indicative of a position of a work surface at the work site, and a controller. The controller is configured to store an electronic map of the work site having a boundary, a work zone, and a boundary zone between the boundary and the work zone, store a target surface, and determine the position of the work surface based upon the position signals. The controller is further configured to select a work zone loading profile for a work zone cut location along the path within the work zone, the work zone loading profile having a work zone cut angle relative to a ground reference and select a final cut loading profile for a final cut location along the path adjacent the boundary zone, the final cut loading profile having a final cut angle relative to the ground reference, the final cut angle being steeper than the work zone cut angle.

DETAILED DESCRIPTION

Figure 1:
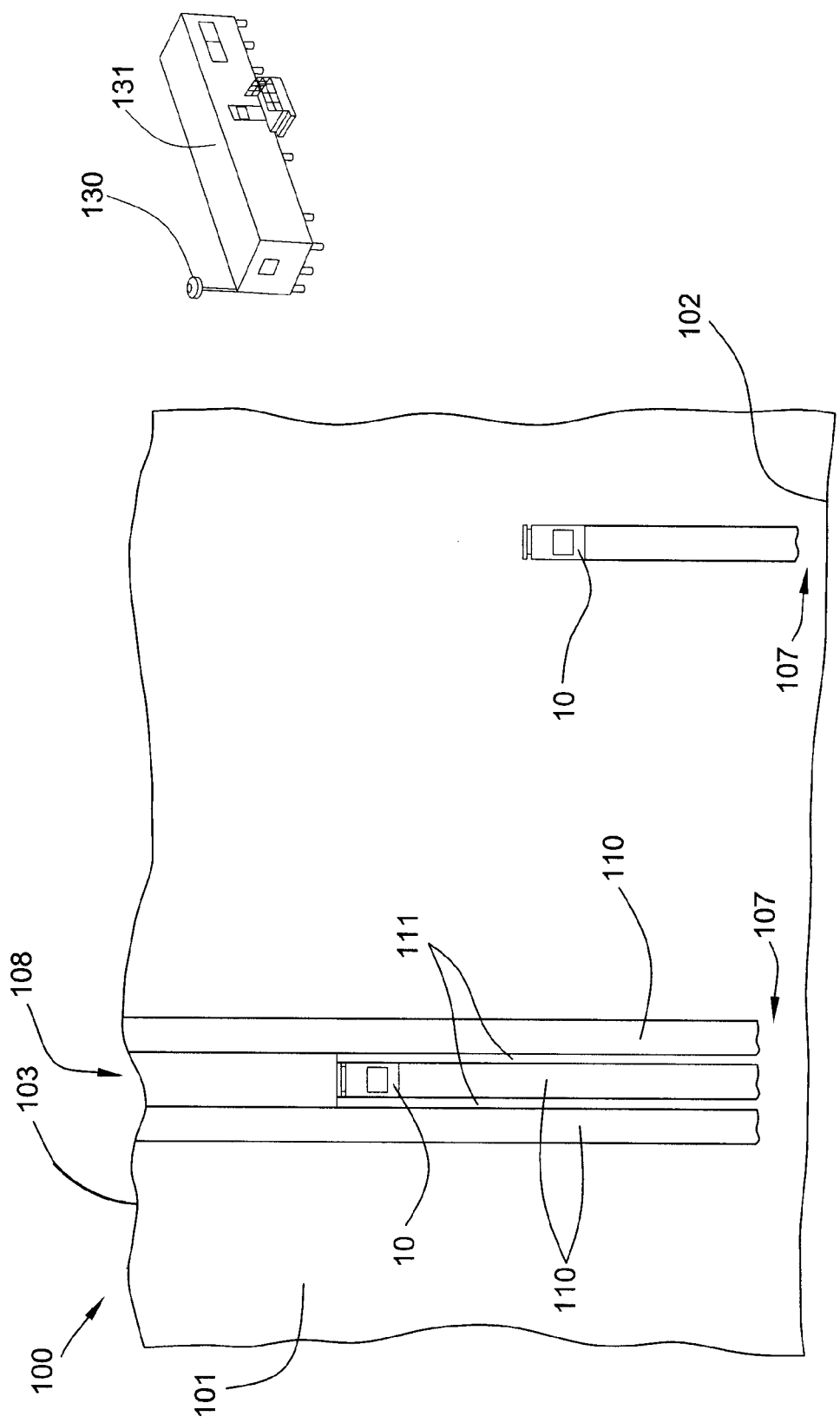
FIG. 1 depicts a schematic view of a work site at which a machine incorporating the principles disclosed herein may be used.

FIG. 1 depicts a diagrammatic illustration of a work site 100 at which one or more machines 10 may operate in an autonomous, a semi-autonomous, or a manual manner. Work site 100 may be a portion of a mining site, a landfill, a quarry, a construction site, or any other area in which movement of material is desired. Tasks associated with moving material may include a dozing operation, a grading operation, a leveling operation, a bulk material removal operation, or any other type of operation that results in the alteration of the existing topography at work site 100. As depicted, work site 100 includes a work area 101 having a high wall 102 at one end and a crest 103 such as an edge of a ridge, embankment, or other change in elevation at an opposite end. Material is moved generally from the high wall 102 towards the crest 103. The work surface 104 of the work area 101 may take any form and refers to the actual profile or position of the terrain of the work area.

As used herein, a machine 10 operating in an autonomous manner operates automatically based upon information received from various sensors without the need for human operator input. As an example, a haul or load truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a load truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
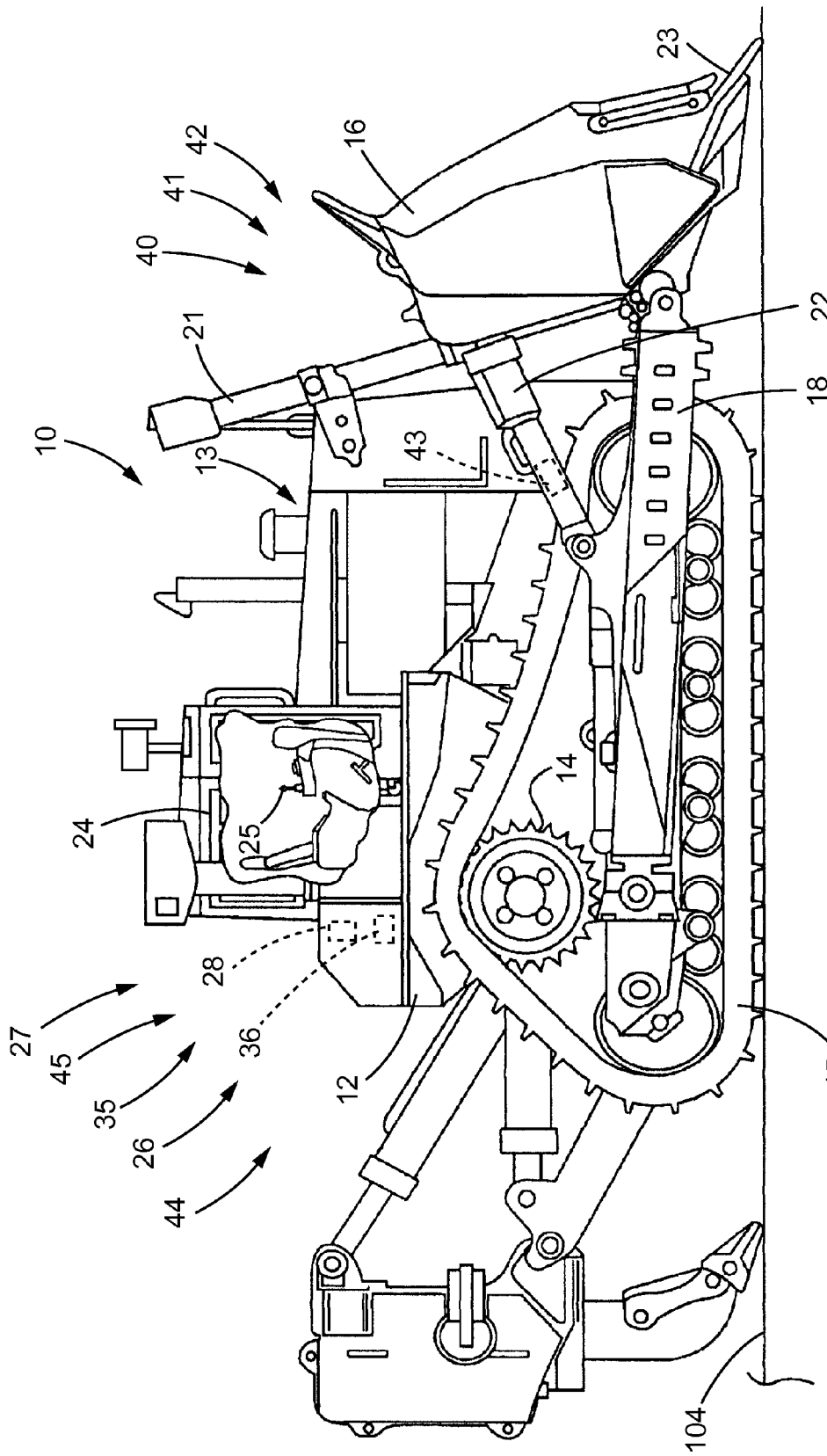
FIG. 2 depicts a diagrammatic illustration of a machine in accordance with the disclosure.

FIG. 2 depicts a diagrammatic illustration of a machine 10 such as a dozer with a ground-engaging work implement such as a blade 16 configured to push material. The machine 10 includes a frame 12 and a prime mover such as an engine 13. A ground-engaging drive mechanism such as a track 15 may be driven by a drive sprocket 14 on opposite sides of machine 10 to propel the machine. Although machine 10 is shown in a "track-type" configuration, other configurations, such as a wheeled configuration, may be used. Operation of the engine 13 and a transmission (not shown), which are operatively connected to the drive sprockets 14 and tracks 15, may be controlled by a control system 35 including a controller 36. The systems and methods of the disclosure may be used with any machine propulsion and drivetrain mechanisms applicable in the art for causing movement of the machine including hydrostatic, electric, or mechanical drives.

Blade 16 may be pivotally connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip 23 to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 35 as shown generally by an arrow in FIG. 2 indicating association with the machine 10. The control system 35 may include an electronic control module or controller 36 and a plurality of sensors. The controller 36 may receive input signals from an operator operating the machine 10 from within cab 24 or off-board the machine through a wireless communications system 130 (FIG. 1). The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and the controller 36 may be located on the machine 10 and may also include components located remotely from the machine such as at a command center 131 (FIG. 1). The functionality of control system 35 may be distributed so that certain functions are performed at machine 10 and other functions are performed remotely. In such case, the control system 35 may include a communications system such as wireless communications system 130 for transmitting signals between the machine 10 and a system located remote from the machine.

Machine 10 may be configured to be operated autonomously, semi-autonomously, or manually. When operating semi-autonomously or manually, the machine 10 may be operated by remote control and/or by an operator physically located within the cab 24.

Machine 10 may be equipped with a plurality of machine sensors 26, as shown generally by an arrow in FIG. 2 indicating association with the machine 10, that provide data indicative (directly or indirectly) of various operating parameters of the machine and/or the operating environment in which the machine is operating. The machine sensors may be mounted on the machine 10 or operate with the machine to provide information as desired. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 2 indicating association with the machine 10, may include a position sensor 28, also shown generally by an arrow in FIG. 2 to indicate association with the machine, to sense the position and orientation (i.e., the heading, pitch, roll or tilt, and yaw) of the machine relative to the work site 100. The position and orientation of the machine 10 are sometimes collectively referred to as the position of the machine. The position sensor 28 may include a plurality of individual sensors that cooperate to generate and provide a plurality of position signals to controller 36 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 36 may use position signals from the position sensors 28 to determine the position of the machine 10 within work site 100. In other examples, the position sensor 28 may include an odometer or another wheel rotation sensing sensor, a perception based system, or may use other systems such as lasers, sonar, or radar to determine all or some aspects of the position of machine 10.

In some embodiments, the position sensing system 27 may include a separate orientation sensing system. In other words, a position sensing system may be provided for determining the position of the machine 10 and a separate orientation sensing system may be provided for determining the orientation of the machine.

If desired, the position sensing system 27 may also be used to determine a ground speed of machine 10. Other sensors or a dedicated ground speed sensor may alternatively be used to determine the ground speed of the machine 10.

Machine 10 may be configured to move material at the work site 100 according to one or more material movement plans from an initial location 107 to a spread or dump location 108. The dump location 108 may be at crest 103 or at any other location. The material movement plans may include, among other things, forming a plurality of spaced apart channels or slots 110 that are cut into the work surface 104 at work site 100 along a path from the initial location 107 to the dump location 108. In doing so, each machine 10 may move back and forth along a linear path between the initial location 107 and the dump location 108. If desired, a relatively small amount of material may be left or built up as walls or berms 111 between adjacent slots 110 to prevent or reduce spillage and increase the efficiency of the material moving process. The berms 111 between the slots 110 may be removed after the slots are formed or periodically as discussed below. The process of moving material through slots 110 while utilizing berms 111 of material to increase the efficiency of the process is sometimes referred to as "slot dozing."

Figure 3:
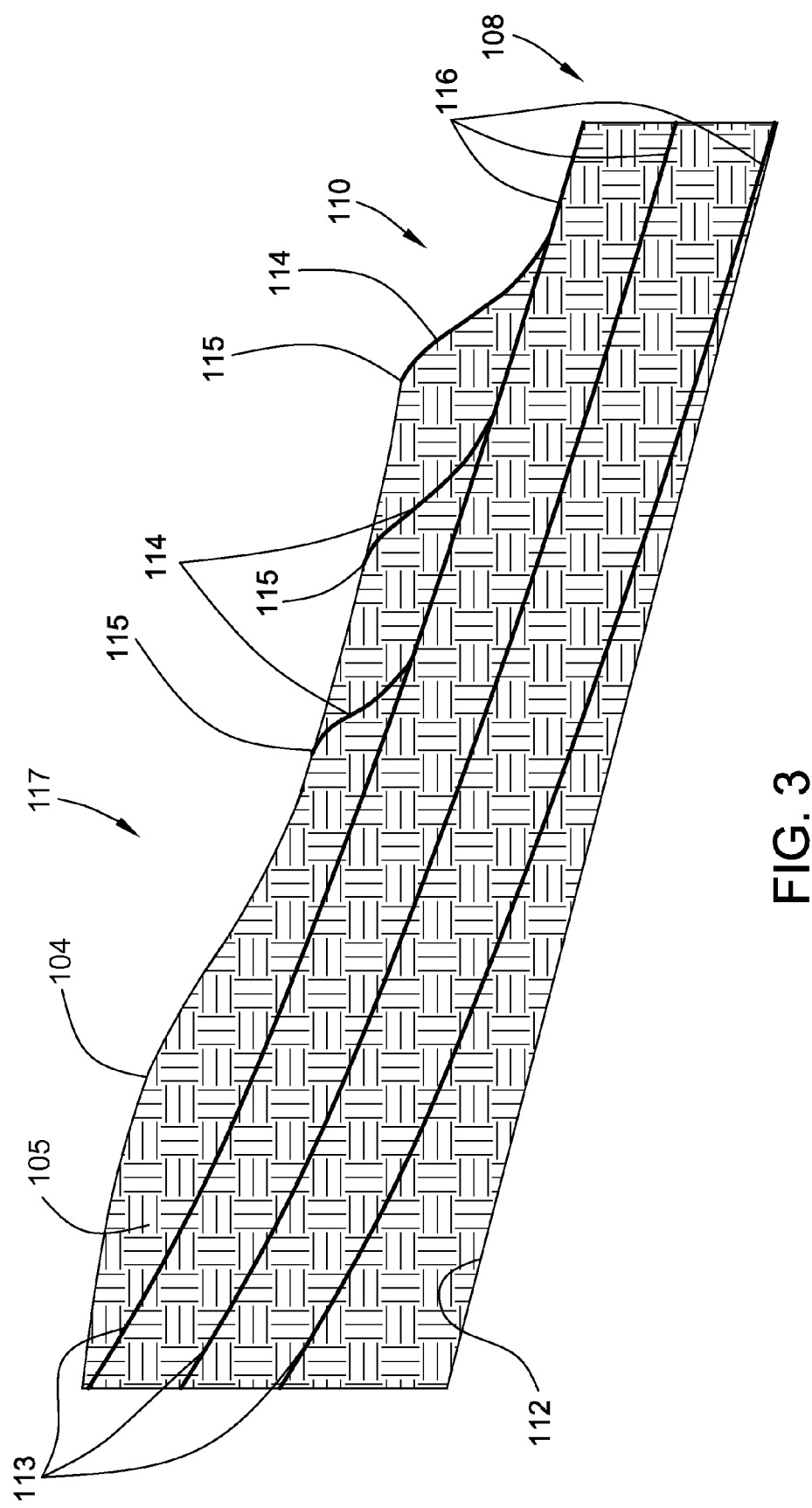
FIG. 3 depicts a cross-section of a portion of a work site depicting various aspects of a material moving plan.

As depicted in FIG. 3, in one embodiment, each slot 110 may be formed by removing material 105 from the work surface 104 in one or more layers or passes 113 until the final work surface or final design plane 112 is reached. The blade 16 of machine 10 may engage the work surface 104 with a series of cuts 114 that are spaced apart lengthwise along the slot 110. Each cut 114 begins at a cut location 115 along the work surface 104 at which the blade 16 engages the work surface and extends into the material 105 and moves towards the target surface for each pass or carry surface 116. Controller 36 may be configured to guide the blade 16 along each cut 114 until reaching the carry surface 116 and then follow the carry surface towards the dump location 108.

Figure 4:
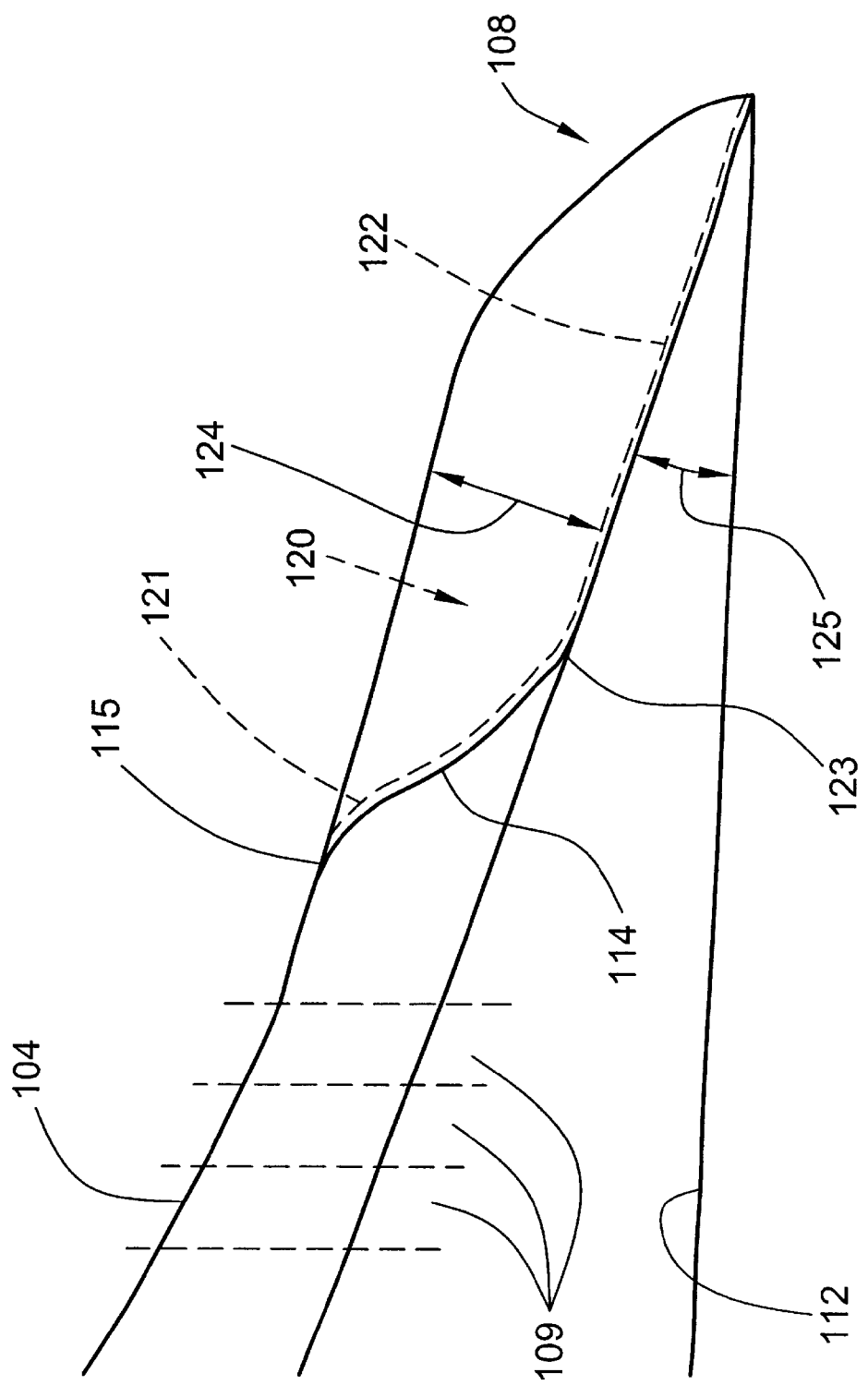
FIG. 4 depicts a diagrammatic cross-section of a portion of a work site depicting a potential target profile.

During each material moving pass, the controller 36 may guide the blade 16 generally along a desired path or target profile depicted by dashed line 120 in FIG. 4 from the cut location 115 to the dump location 108. A first portion of the target profile 120 extends from the cut location 115 to the carry surface 116. The first portion may be referred to as the loading profile 121 as that is the portion of the target profile 120 at which the blade 16 is initially loaded with material. A second portion of the target profile 120 extends from the intersection 123 of the cut 114 and the carry surface 116 to the dump location 108. The second portion may be referred to as the carry profile 122 as that is the portion of the target profile 120 at which the blade 16 carries the load along the carry surface 116.

The first portion or loading profile 121 may have any configuration and, depending on various factors including the configuration of the work surface 104 and the type of material to be moved, some cut profiles may be more efficient than others. The loading profile 121 may be formed of one or more segments that are equal or unequal in length and with each having different or identical shapes. These shapes may be linear, symmetrically or asymmetrically curved, Gaussian-shaped or any other desired shape. In addition, the angle of any of the shapes relative to the work surface 104 or the final design plane 112 may change from segment to segment.

The second portion or carry profile 122 may have any configuration but is often generally linear and sloped downward so that movement of material will be assisted by gravity to increase the efficiency of the material moving process. In other words, the carry profile 122 is often configured so that it slopes downward towards the dump location 108. The characteristics of the carry profile 122 (sometimes referred to as the slot parameters) may define the shape of the carry surface 116, the depth of the carry surface 116 below an uppermost surface of the work surface 104 as indicated by reference number 124, and the angle of the carry surface as indicated by reference number 125. In some instances, the angle 125 of the carry surface 116 may be defined relative to a gravity reference or relative to the final design plane 112.

Although it may be generally desirable for the blade 16 to follow the target profile 120, performance characteristics of the machine 10, characteristics of the material 105, and/or desired operating efficiencies may cause a deviation from the target profile 120. More specifically, as blade 16 makes a cut 114, the load on the blade will increase. Further, as the blade 16 travels along the carry surface 116, the load on the blade may continue to increase. If the blade 16 is overloaded for a particular slope, the machine 10 may slip and/or cause excess wear on the machine. Accordingly, the control system 35 may include a blade control system 40 to improve the efficiency of the material moving process.

In one embodiment, the blade control system 40 may control the load on the blade 16 so that the torque generated by the machine 10 is generally maintained at or about a predetermined value. In one example, it may be desirable to maintain the load on the machine 10 at approximately 80% of its maximum torque. In other examples, it may be desirable to maintain the load within a range of approximately 70-90% of the maximum torque. Other values and ranges are contemplated. In order to maintain the load at a desired value or within a desired range, the blade control system 40 may raise or lower the blade 16 to decrease or increase the amount of material carried by the blade 16 and thus decrease or increase the load.

The control system 35 may include an implement load monitoring system 41 shown generally by an arrow in FIG. 2. The implement load monitoring system 41 may include a variety of different types of implement load sensors depicted generally by an arrow in FIG. 2 as an implement load sensor system 42 to measure the load on the blade 16. In one embodiment, the implement load sensor system 42 may embody one or more pressure sensors 43 for use with one or more hydraulic cylinder, such as second hydraulic cylinders 22, associated with blade 16. Signals from the pressure sensor 43 indicative of the pressure within the second hydraulic cylinders 22 may be monitored by controller 36. Other ways of determining a change in cylinder pressure associated with a change in the load on blade 16 are contemplated, including other ways of measuring the pressure within second hydraulic cylinders 22 and measuring the pressure within other cylinders associated with the blade. The load on the blade 16 may be correlated to the load on the engine 13 by controller 36.

The load on the blade 16 may be affected by the slope of the terrain upon which the machine 10 is moving. Accordingly, if desired, the accuracy of the implement load measurement may be increased by utilizing the implement load sensor system 42 in conjunction with a slope or inclination sensor such as a pitch angle sensor. For example, if the machine 10 is moving uphill, the load on the blade 16 may be higher due to gravity as compared to a machine operating in the same conditions on flat terrain. Similarly, the load on the blade 16 may be lower for the same mass or volume when the machine in moving downhill. By determining the slope of the terrain, the controller 36 may more accurately determine changes in the load on the blade 16.

As used herein, the word "uphill" refers to a direction towards the high wall 102 relative to the crest 103 or dump location 108. Similarly, the word "downhill" refers to a direction towards the crest 103 or dump location 108 relative to the high wall 102.

If desired, control system 35 may also include a machine load monitoring system 44 that may be used by the blade control system 40. In one embodiment, the machine load monitoring system 44 may utilize an engine speed sensor (not shown) and a torque converter speed sensor (not shown) to measure a difference between the speed of the engine 13 and a torque converter (not shown) to determine the load on the machine 10.

Control system 35 may include a module or planning system 45 for determining or planning various aspects of the excavation plan. The planning system 45 may receive and store various types of input such as the configuration of the work surface 104, the final design plane 112, a desired loading profile 121, a desired carry profile 122, and characteristics of the material to be moved. Operating characteristics and capabilities of the machine 10 such as maximum load may also be entered into the planning system 45. The planning system 45 may simulate the results of cutting the work surface 104 at a particular cut location and for a particular target profile, and then choose a cut location that creates the most desirable results based on one or more criteria. In one embodiment, the planning function may be performed while operating the machine 10. In another embodiment, some or all aspects of the planning function may be performed ahead of time and the various inputs to the planning system 45 and the resultant cut locations, target profiles, and related data stored as part of the data maps of the controller 36.

Referring to FIGS. 3 and 4, a potential cut 114 at work site 100 that may be generated by control system 35 is illustrated. Work surface 104 represents the uppermost height of the existing material 105 at the slot 110. While the illustration is depicted in two dimensions, it should be appreciated that the data representing the illustration may be in three dimensions. In one example, the path 117 along slot 110 may be divided into a plurality of increments 109 (FIG. 4) and data stored within controller 36 for each increment. The controller 36 may store information or characteristics of the increment 109 such as the length of the work surface and its angular orientation relative to a ground reference, the material characteristics of the material 105 beneath the work surface, a time stamp or indicator of the age of the data, and any other desired information. The information regarding each path 117 may be stored within an electronic map within controller 36 as part of a topographical map of the work site 100.

Information regarding each path 117 may be obtained according to any desired method. In one example, the machine 10 may utilize the position sensing system 27 described above to map out the contour of work surface 104 as machine 10 moves across it. This data may also be obtained according to other methods such as by a vehicle that includes lasers and/or cameras. It should be noted that as the machine 10 moves material 105 to the dump location 108, the position of the work surface 104 will change and may be updated based upon the current position of the machine 10 and the position of the blade 16.

As may be seen in FIG. 4, moving the blade 16 along the target profile 120 will result in a volume of material 105 being moved from slot 110. The planning system 45 may use the shape of the loading profile 121 and the cut location 115 to determine the volume of material that would be moved by blade 16 if the machine 10 were to follow the target profile 120. More specifically, the planning system 45 may use three-dimensional data that represents the machine 10, the work surface 104, and the target profile 120 to make a volumetric calculation of the volume of material that will be moved for a particular target profile 120.

Figure 5:
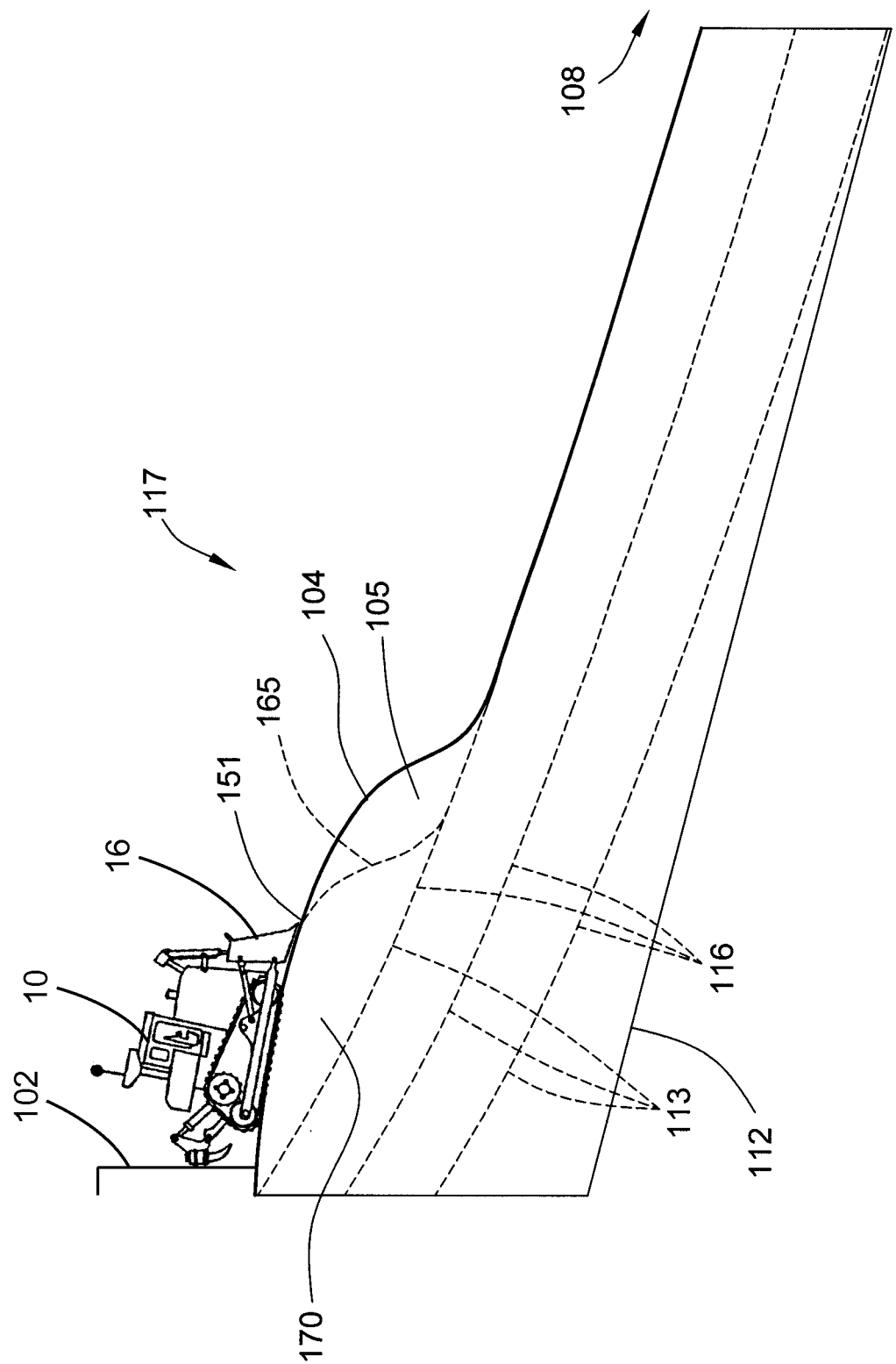
FIG. 5 depicts cross section of a portion of a work site depicting an aspect of a cut optimization process in accordance with the disclosure.

When performing material moving operations such as slot dozing, material 105 is generally moved downhill from the initial location 107 such as high wall 102 to the dump location 108. As the machine 10 performs material moving operations away from high wall 102 towards dump location 108, the machine 10 moves material 105 along each carry surface 116 to dump location 108. The machine 10 begins a new cutting operation by backing up along the path 117 until reaching a new cut location and beginning the cutting process. Eventually, as depicted in FIG. 5, the machine 10 may back up until it reaches the high wall 102 and only one more cut is possible along the carry surface 116. The final cut location 151 marks the edge or boundary at which the machine 10 may operate to cut material 105. That is, after completing a cut at final cut location 151, the machine 10 will not be able to make any additional cuts to carry surface 116 even if the machine is backed up to high wall 102. The final cut location 151 may be set a distance from the high wall 102 equal to the distance from the rear end of the machine 10 to the tip 23 of the blade 16. Referring to FIG. 5, machine 10 is depicted against the high wall 102 with the blade 16 aligned with final cut location 151.

Upon making the final cut 165 at the final cut location 151, the planning system 45 may be configured to direct the machine 10 to begin making cuts that extend through work surface 104 to the next lower carry surface 116. This process may be repeated as desired such as until reaching the final design plane 112. However, since the machine 10 is only able to back up to the high wall 102, the machine is not able to cut the material immediately adjacent the high wall and thus material will build up adjacent the high wall over time as depicted at 170 in FIG. 6.

Figure 6:
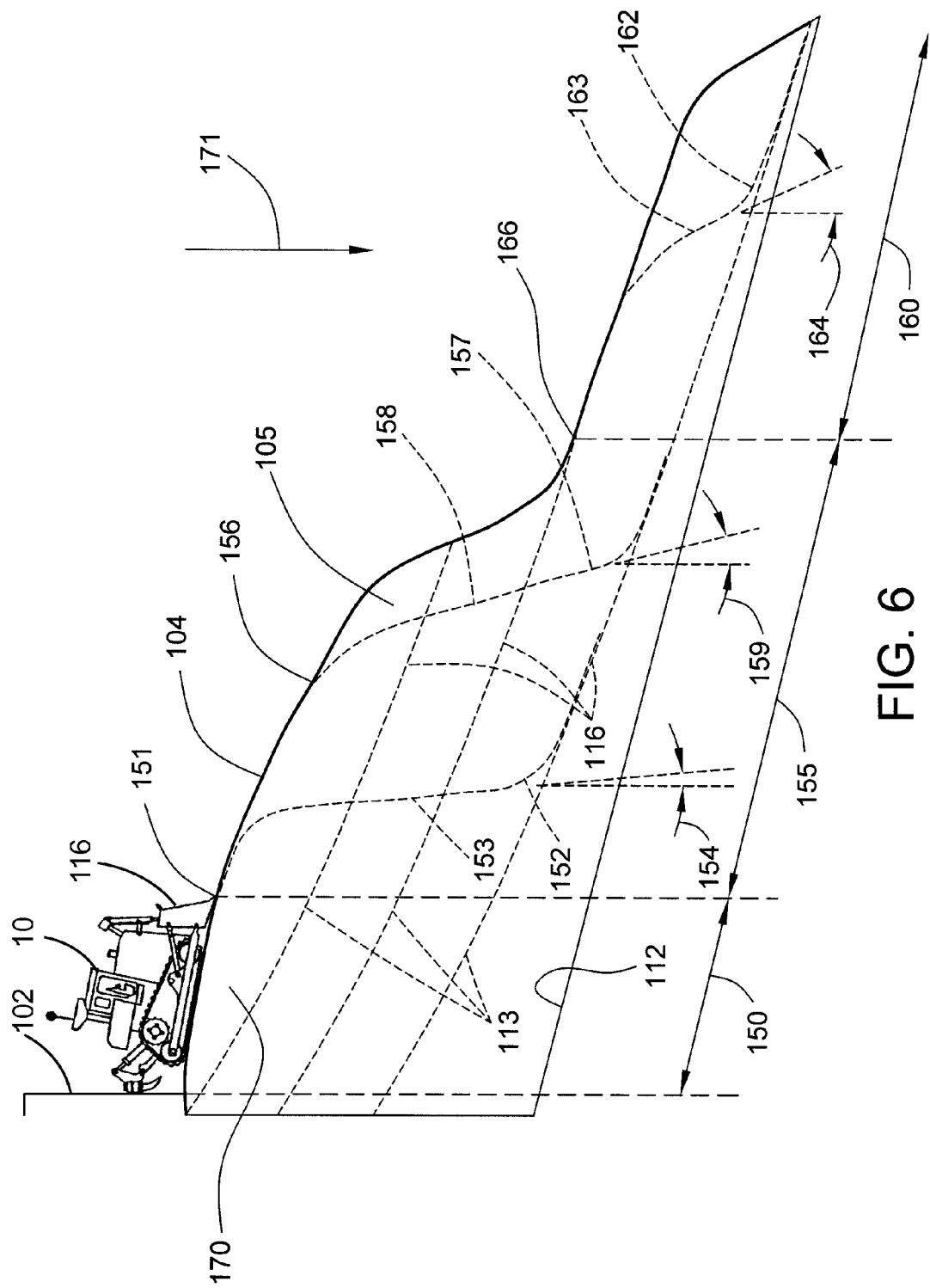
FIG. 6 depicts cross section of a portion of a work site depicting another aspect of a cut optimization process in accordance with the disclosure.

Referring to FIG. 6, a cross section of a portion of the work site 100 adjacent high wall 102 is depicted after a plurality of cuts along a plurality of passes 113. The portion of the work site 100 depicted in FIG. 6 is divided into 3 sections. A first or outer section 150 closest to or immediately adjacent high wall 102 has machine 10 positioned thereon and is the material 170 that the machine cannot cut using a conventional slot dozing process. The outer section 150 has a length generally equal to the length of the machine 10 plus the blade 16 and generally extends between or is defined by the distance from the high wall 102 to the final cut location 151.

A second section or boundary zone 155 is adjacent the outer section 150 but downhill from the high wall 102. A third section or work zone 160 extends downhill from the boundary zone 155 and may generally encompass the remainder of the work site 100.

The depth or thickness of the three sections may be defined by the distance from the carry surface 116 to the work surface 104 at each section. As a result, the outer section 150 is thicker than the boundary zone 155 and the boundary zone is thicker than the work zone 160. The thickness of the outer section 150 is generally defined by the original position of the work surface 104 since the machine 10 does not operate to move material on that portion of the work surface during a typical slot dozing process.

The depth or thickness of the work zone 160 may generally equal the distance between carry surfaces 116. More specifically, since the planning system 45 may be configured so that each cut within the work zone extends down to the next carry surface 116, the work zone cut depth is generally equal to the distance between carry surfaces. The depth or thickness of the boundary zone 155 may generally taper or slope since the boundary zone 155 interconnects the work surface 104 at the outer section 150 with the work surface at the work zone 160.

Details regarding the outer section 150, the boundary zone 155, and the work zone 160 may be stored within an electronic map. The boundary zone 155 may be configured within the electronic map as a boundary zone that extends a predetermined distance from the boundary into the work zone 160. The intersection between the outer section 150 and the boundary zone 155 may be configured within the electronic map as a boundary of the boundary zone and may correspond to the final cut location 151. The work zone 160 may be configured within the electronic map as a portion of the work site 100 that is outside of the boundary zone.

Planning system 45 may be configured to generate cuts within the work zone 160 based upon the desired load on blade 16, the material characteristics of material 105, the distance between the work surface 104 and the carry surface 116, and any other desired factors. More specifically, cuts within the work zone 160, such as that at work zone cut location 161 (FIG. 6), may follow a work zone target profile 162 that has a generally Gaussian-shaped work zone loading profile 163 that leads to and intersects with carry surface 116. The work zone loading profile 163 may have any desired shape and generally has a work zone cut angle relative to a gravity reference 171 as depicted at 164.

While portions of the work zone loading profile 163 vary from the work zone cut angle 164, the work zone cut angle is the average or general angle of the work zone loading profile 163 relative to the gravity reference. In addition, it should be noted that the work zone cut angle 164 defines the maximum angle of the work zone loading profile 163 and there may be instances in which the average or general work zone cut angle is less or shallower depending upon the operating characteristics of the machine 10, the characteristics at work site 100, and other factors.

Planning system 45 may also be configured to generate cuts within boundary zone 155 beginning at final cut location 151. A cut at the final cut location 151 may follow a final cut target profile 152 that has a generally Gaussian-shaped final cut loading profile 153 and leads to and intersects with carry surface 116. The final cut loading profile 153 generally has a final cut angle relative to the gravity reference 171 as depicted at 154. As with the work zone cut angle 164, the final cut angle 154 is the average or general angle of the final cut loading profile 153 relative to the gravity reference. The final cut angle 154 may be steeper or more aggressive than the work zone cut angle 164.

In general, the work zone cut angle 164 is limited by the kinematics of the machine 10, material characteristics of material 105, and desired operating efficiencies of the machine. For example, the blade 16 of machine 10 may not be able to follow the path of the work zone loading profile 163 if it is too steep given the relatively small depth or thickness between carry surfaces (e.g., 2-4 feet) at the work zone 160. In addition, it is generally desirable to back up machine 10 in second gear while operating in reverse after a cut to minimize the time required for traveling along the path and to minimize fuel consumption. If the work zone loading profile 163 were too steep, the machine 10 would need to operate in first gear to travel in reverse past a previous cut formed by the loading profile.

More specifically, the transmission (not shown) is operatively connected between the prime mover and the ground-engaging drive mechanism. The transmission may include a plurality of forward and reverse gears. The lower the gear, the higher the gear ratio. Accordingly, a first reverse gear has a higher gear ratio than a second reverse gear.

The final cut loading profile 153 may be substantially steeper than the work zone loading profile 163 due to its greater depth or thickness. For example, the distance between the work surface 104 and the relevant carry surface 116 at the final cut location 151 may be as much as 8-12 feet. Accordingly, the kinematics of the machine 10 will permit a substantially steeper final cut loading profile 153 as compared to the work zone loading profile 163. In addition, since the machine 10 will only be operating in reverse for a very short distance adjacent the outer section 150 and the boundary zone 155, operating in reverse while in first gear due to a relatively steep slope will not result in a significant loss of time or fuel consumption.

More specifically, the transmission (not shown) is operatively connected between the prime mover and the ground-engaging drive mechanism. The transmission may include a plurality of forward and reverse gears. As is typical, the lower the gear, the higher the gear ratio. Accordingly, a first reverse gear has a higher gear ratio than a second reverse gear. The final cut loading profile 153 may be configured so that moving the blade 16 along the final cut loading profile will define a slope too steep for the machine 10 to climb while operating with the transmission in the second reverse gear.

Planning system 45 may be configured to generate a plurality of cuts at a plurality of cut locations 156 within the boundary zone 155 (i.e., between final cut location 151 and the intersection 166 of the boundary zone 155 and the work zone 160). Each of the cuts within the boundary zone 155, such as that depicted at 156) may follow a boundary zone target profile 157 that has a generally Gaussian-shaped boundary zone loading profile 158 which leads to and intersects with carry surface 116. Each boundary zone loading profile 158 generally has a boundary zone cut angle relative to the gravity reference 171 as depicted at 159. As with the work zone cut angle 164, the boundary zone cut angle 159 is the average or general angle of the final cut loading profile 153 relative to the gravity reference. The boundary zone cut angle 159 may be between the final cut angle 154 and the work zone cut angle 164.

In one example, the boundary zone cut angle 159 may change linearly based upon the distance between the work surface 104 and the carry surface 116 at each boundary zone cut location 156. More specifically, the planning system 45 may determine the final cut angle 154 and the distance between the work surface 104 and the carry surface 116 at the final cut location 151 (i.e., the final cut depth). The planning system 45 may also determine the work zone cut angle 164 and the distance between the work surface 104 and the carry surface 116 within the work zone 160 (i.e., the work zone cut depth) The planning system 45 may determine the distance between the work surface 104 and the carry surface 116 at the boundary zone cut location (i.e., the boundary zone cut depth). The boundary zone cut angle 159 of any cut within the boundary zone 155 may be linearly proportional to the boundary zone cut depth, the work zone cut depth, and the final cut depth.

Figure 7:
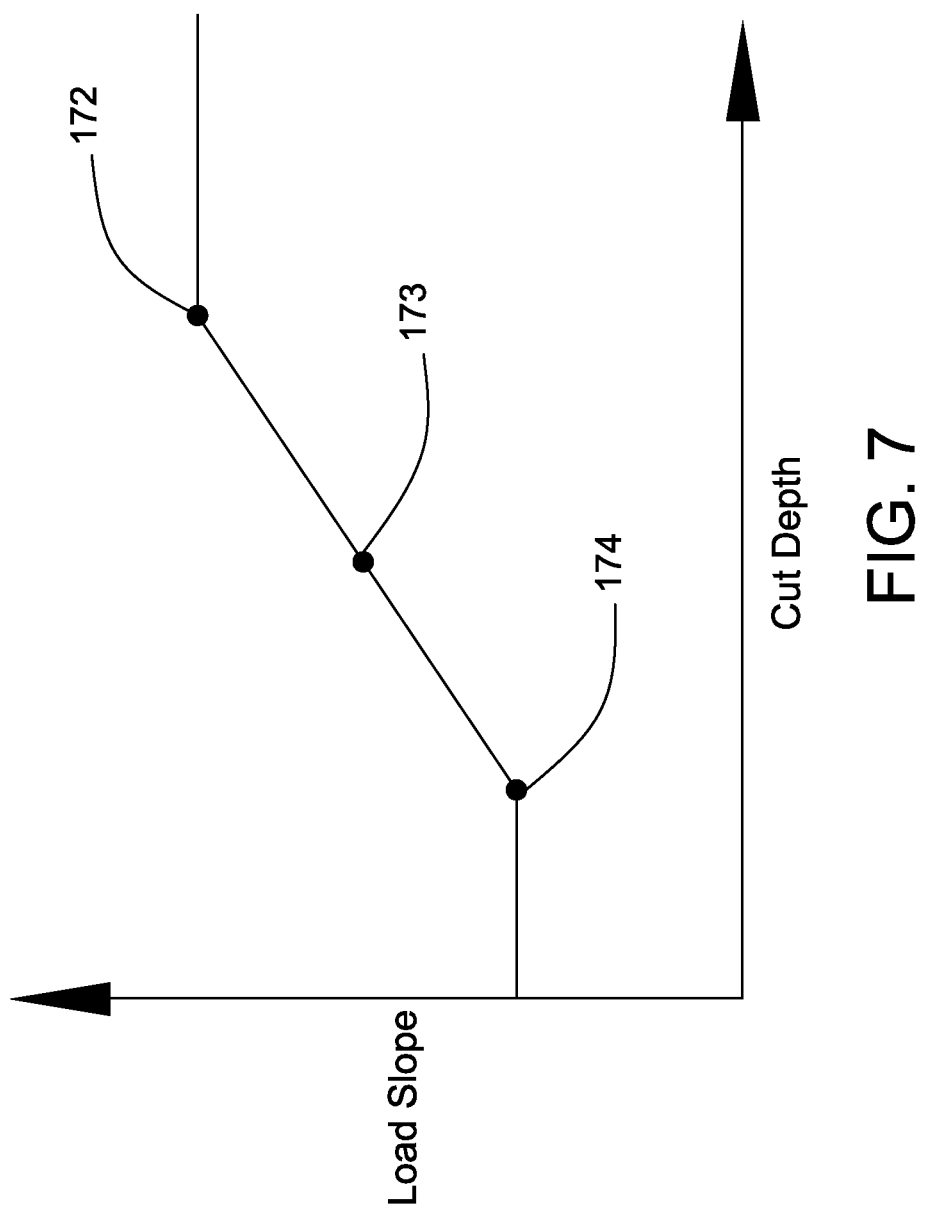
FIG. 7 depicts a graph illustrative of an aspect of the disclosure.

Referring to FIG. 7, a graph is depicted with the cut depth (i.e., the distance between the work surface 104 and the carry surface 116) on the x-axis and the loading profile angle on the y-axis. The boundaries of the graph are set with the final cut angle 154 and height at the final cut location 151 depicted at 172 and the work zone cut angle 164 and height at the work zone cut location 161 depicted at 174. The boundary zone cut angle 159 of any cut within the boundary zone 155 may be determined based upon the cut depth at the specified boundary zone cut location 156. In an example in which the distance between the work surface 104 and the carry surface 116 is halfway between the distances of the work surface from the carry surface at the final cut location 151 and the work zone cut location 161, the boundary zone cut angle 159 would be halfway between the final cut angle 154 and the work zone cut angle 164 as depicted at 173.

Although only one boundary zone cut location 156 is depicted within the boundary zone 155, a plurality of cuts may be made within the boundary zone. The number and specific locations of the plurality of boundary zone cut locations 156 along the path 117 within the boundary zone 155 may be determined by the planning system 45 based upon the amount or volume of material 105 within the boundary zone 155, the material characteristics of the material, and the capacity of machine 10.

In addition to setting the boundary zone cut angles 159 to be linearly proportional to the cut depth, other manners of setting the boundary zone cut angles are contemplated. In many instances, since the work surface 104 along the boundary zone 155 generally slopes downhill, the boundary zone cut depth will generally decrease as the starting point or boundary zone cut location 156 of each boundary zone cut moves downhill. As a result, the boundary zone cut angle 154 of each boundary zone loading profile 153 will typically be steeper than the boundary zone cut angle of any boundary zone loading profile corresponding to a boundary zone cut location closer to the work zone 160. In another example, the boundary zone loading profiles 153 have boundary zone cut angles 154 that are progressively steeper closer to the boundary or the final cut location 151.

Planning system 45 may be configured to provide or generate a notice or instructions such as alert commands based upon operation of the machine 10 at or near boundary zone 155. In one example, an alert command may be generated when the height of the outer zone 150 exceeds a predetermined level relative to the work zone 160. In other words, the planning system may generate an alert command upon the final cut depth exceeding the work zone cut depth by a predetermined height. In another example, an alert command may be generated each time a machine 10 makes a final cut 165 and begins cutting through work surface 104 to the next carry surface 116.

Figure 8:
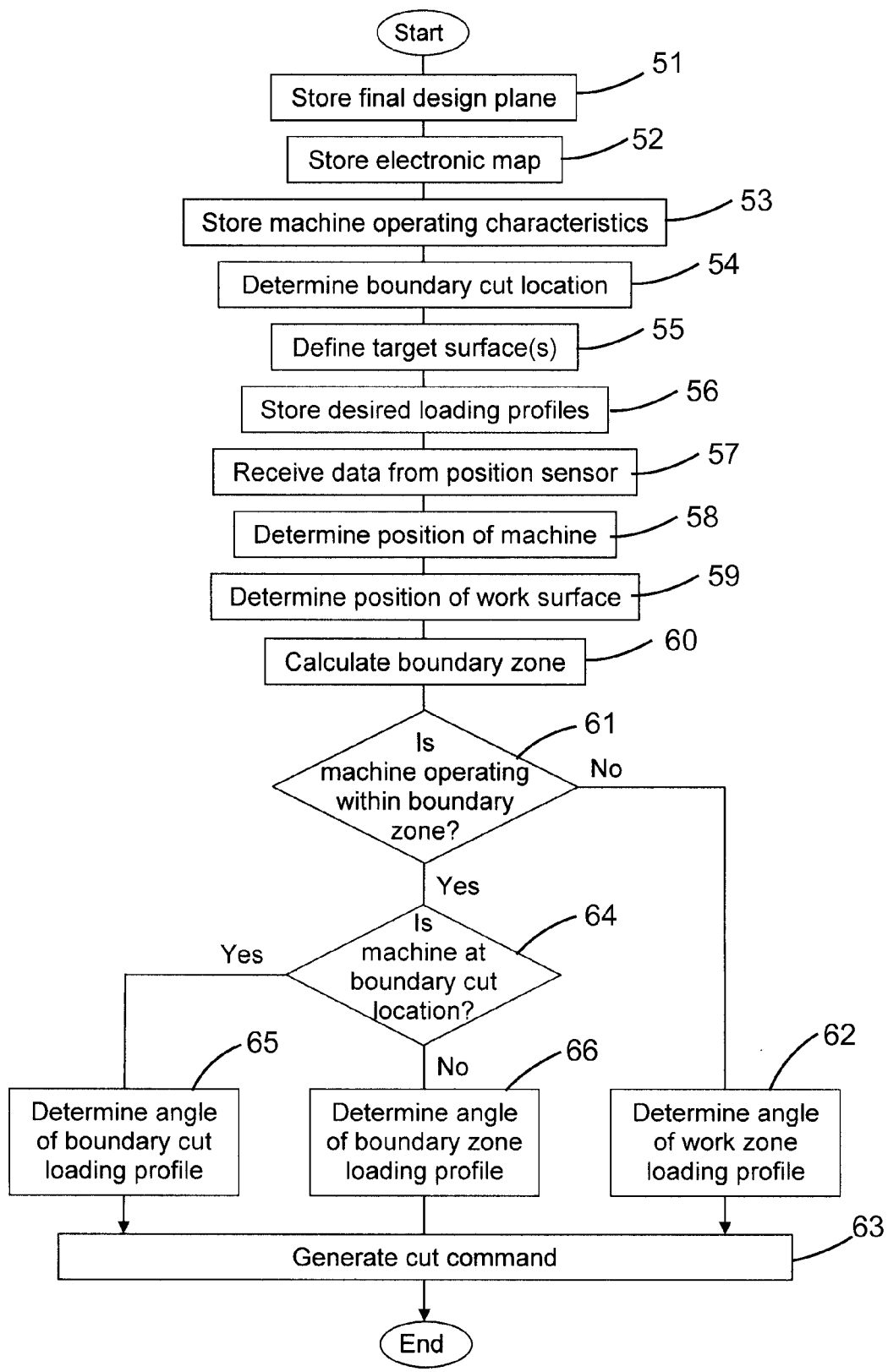
FIG. 8 depicts a flowchart illustrating the cut optimization process in accordance with the disclosure.

The flowchart in FIG. 8 depicts a process in which the planning system 45 may determine the loading profiles for cuts that occur at work site 100. At stage 51, the final design plane 112 may be set or stored within or entered into controller 36. In one embodiment, the final design plane 112 may be entered by an operator or other personnel. In another embodiment, the final design plane 112 may be generated by the controller 36.

At stage 52, an electronic map of the work site 100 including the position of the high wall 102 may be entered into controller 36. The electronic map may be generated in any desired manner including moving machines autonomously about the work site 100. In an alternative step, an operator may manually operate machine 10, either from within the cab 24 of the machine or by remote control, and the topography of the work site recorded. In still another alternate embodiment, an electronic map of the work site 100 may be determined by moving a mapping vehicle (not shown) about the work site.

At stage 53, operating characteristics of machine 10 may be entered into controller 36. The operating characteristics may include a desired maximum load on the machine 10 and the dimensions of the machine including those of blade 16. The dimensions of blade 16 may be used by controller 36 to determine the volume of material that will be moved by machine 10.

Based upon the position of the high wall 102, the controller 36 may determine at stage 54 the position of the final cut location 151. The final cut location 151 may be set at a predetermined distance from the high wall 102 generally equal to the instance from the end of the machine 10 to the tip 23 of blade 16. This distance represents the closest location to the high wall 102 that the machine 10 may begin to cut the work surface 104.

Based upon electronic map of the work site 100, a plurality of target or carry surfaces 116 may be established at stage 55 either by controller 36 or set manually by an operator or other personnel. The shape of the desired loading profiles may be set or stored in controller 36 at stage 56. As stated above, the loading profiles may have any desired configuration or shape.

The controller 36 may receive at stage 57 data from the position sensor 28. At stage 58, the controller 36 may determine the position of the machine 10 based upon the data from the position sensor 28. As the machine 10 moves along the path 117, the position of the machine may be used to determine, based upon the known dimensions of the machine 10, the position of the work surface 104 at stage 59 and update the electronic map of the work site 100 within controller 36.

At stage 60, the controller 36 may determine the location of the boundary zone 155. To do so, the controller 36 may determine the downhill boundary of the boundary zone 155 by determining the location closest to the high wall 102 at which the distance from the work surface 104 to the current carry surface 116 is equal to the distance between passes 113. The controller may determine the uphill boundary (i.e., the final cut location 151) based upon the dimensions of machine 10 and the position of high wall 102.

At decision stage 61, the controller 36 may determine whether the machine 10 is operating within the boundary zone 155. If the machine 10 is outside of the boundary zone 155, the controller 36 may determine the angle of the work zone loading profile 163 at stage 62. In doing so, the controller 36 may base the angle of the work zone loading profile 163 upon a plurality of factors. However, the controller 36 may be configured to generate an angle less than the work zone cut angle 164. At stage 63, the controller 36 may generate appropriate commands to direct the machine 10 to cut the work surface 104 at the work zone cut location 161 utilizing the work zone target profile 162.

If the machine 10 is inside the boundary zone 155, the controller 36 may determine at decision stage 64 whether the machine is at the final cut location 151. If the machine is at the final cut location 151, the controller 36 may set at stage 65 the final cut angle 154 for the final cut loading profile 153 based upon the final cut depth. At stage 63, the controller 36 may generate appropriate commands to direct the machine 10 to cut the work surface 104 at the final cut location 151 utilizing the final cut target profile 152.

If the machine 10 is within the boundary zone 155 but not at the final cut location 151, the controller 36 may determine at stage 66 the boundary zone cut angle 159 based upon the boundary zone cut depth at the boundary zone cut location 156. In some instances, the boundary zone cut angle 159 may be linearly proportional to the cut depth corresponding to the final cut angle 154 and the work zone cut angle 164. After determining the boundary zone cut angle 159, the controller 36 may generate at stage 63 appropriate commands to direct the machine 10 to cut the work surface at the boundary zone cut location 156 utilizing the boundary zone target profile 157.

INDUSTRIAL APPLICABILITY

The industrial applicability of the control system 35 described herein will be readily appreciated from the forgoing discussion. The foregoing discussion is applicable to systems in which one or more machines 10 are operated autonomously, semi-autonomously, or manually at a work site 100. Such system may be used at a mining site, a landfill, a quarry, a construction site, a roadwork site, a forest, a farm, or any other area in which movement of material is desired.

As machines 10 move material about the work site 100, areas adjacent a boundary such as near a high wall 102 may be difficult for the machines to access and move. In some situations, the material near the boundary may be higher above a carry surface 116 than in areas away from the boundary such as in the work zone 160. Rather than using the same loading profile (or more specifically the same loading profile angle) throughout the work site 100, the planning system 45 may be configured to alter the angle of the loading profile depending upon the proximity of the cut location to the boundary.

More specifically, the planning system 45 may include a work zone cut angle 164 for the work zone loading profile 163. In operation, the planning system may generate work zone loading profiles 163 having any of a plurality of angles relative to a gravity reference but such angles may not exceed the work zone cut angle 164. A final cut loading profile 153 may be used at final cut location 151 and has a final cut angle 154 that is steeper than the work zone cut angle 164. Cuts that occur at boundary zone cut locations 156 are made along boundary zone loading profiles 158. The boundary zone cut angles 159 of the boundary zone loading profiles 158 may be between the final cut angle 154 and the work zone cut angle 164. In one embodiment, the boundary zone cut angle 159 may be set based upon the boundary zone cut depth at the boundary zone cut location 156.

Since the work surface 104 along the boundary zone 155 generally slopes downhill, the boundary zone cut depth will generally decrease as the starting point or boundary zone cut location 156 of each boundary zone cut moves downhill. As a result, the boundary zone cut angle 154 of each boundary zone loading profile 153 will typically be steeper than the boundary zone cut angle of any boundary zone loading profile corresponding to a boundary zone cut location closer to the work zone 160.

The planning system 45 may be utilized to move material 105 within the boundary zone 155 to reduce the need for other machines or other operations to move the material adjacent a boundary. As a result, the system described herein may be more efficient as compared to systems in which machines 10 operate with a consistent or constant loading profile angle.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for autonomous control of a machine having a ground-engaging work implement, the machine moving on a work surface along a path at a work site, comprising:
a position sensor for generating position signals indicative of a position of the work surface; and
a controller configured to:
store an electronic map of the work site, the work site including a boundary, a work zone, and a boundary zone between the boundary and the work zone;
store a target surface;
determine the position of the work surface based upon the position signals;
select a work zone loading profile for a work zone cut location along the path within the work zone, the work zone loading profile having a work zone cut angle relative to a ground reference;
select a final cut loading profile for a final cut location along the path adjacent the boundary zone, the final cut loading profile having a final cut angle relative to the ground reference, the final cut angle being steeper than the work zone cut angle.

2. The system of claim 1, wherein the controller is further configured to select a boundary zone loading profile for a boundary zone cut location along the path within the boundary zone, the boundary zone loading profile having a boundary zone cut angle relative to the ground reference, and the boundary zone cut angle is steeper than the work zone cut angle.

3. The system of claim 2, wherein the final cut angle is steeper than the boundary zone cut angle.

4. The system of claim 1, wherein the controller is further configured to select a boundary zone loading profile for a boundary zone cut location along the path within the boundary zone, the boundary zone loading profile having a boundary zone cut angle relative to the ground reference, the boundary zone loading profile having a boundary zone cut depth equal to a distance between the work surface and the carry surface at the boundary zone cut location, the work zone loading profile having a work zone cut depth equal to a distance between the work surface and the carry surface at the work zone cut location, and the final cut loading profile having a final cut depth equal to a distance between the work surface and the carry surface at the final cut location, the boundary zone cut angle, the work zone cut angle, and the final cut angle are linearly proportional to the boundary zone cut depth, the work zone cut depth, and the final cut depth, respectively.

5. The system of claim 1, wherein the controller is further configured to generate a boundary zone loading profile for each of a plurality of boundary zone cut locations along the path within the boundary zone, each boundary zone loading profile includes a boundary zone cut angle relative to the ground reference, and the boundary zone cut angle of each boundary zone loading profile is steeper than the boundary zone cut angle of any boundary zone loading profile corresponding to a boundary zone cut location closer to the work zone.

6. The system of claim 1, wherein the controller is further configured to generate a boundary zone loading profile for each of a plurality of boundary zone cut locations along the path within the boundary zone, each boundary zone loading profile includes a boundary zone cut angle relative to the ground reference, and the boundary zone cut angles are progressively steeper closer to the boundary.

7. The system of claim 1, wherein the boundary zone begins a predetermined distance from the boundary.

8. The system of claim 7, wherein the predetermined distance is equal to a distance from a rear end of the machine to a tip of a blade of the machine.

9. The system of claim 1, wherein the controller is further configured to generate an alert command upon a final cut depth exceeding a work zone cut depth by a predetermined height.

10. The system of claim 1, wherein the machine includes a prime mover, a ground-engaging drive mechanism, and a transmission operatively connected between the prime mover and the ground-engaging drive mechanism, the transmission including a first reverse gear and a second reverse gear, the first reverse gear having a higher gear ratio than the second reverse gear, wherein moving the ground-engaging work implement along the final cut loading profile defines a slope too steep for the machine to climb while operating with the transmission in the second reverse gear.

11. The system of claim 1, wherein the position sensor is mounted on the machine.

12. A controller-implemented method for autonomous control of a machine having a ground-engaging work implement, the machine moving on a work surface along a path at a work site, comprising:
storing an electronic map of a the work site, the work site including a boundary, a work zone, and a boundary zone between the boundary and the work zone;
storing a target surface;
determining a position of the work surface based upon position signals from a position sensor;
selecting a work zone loading profile for a work zone cut location along the path within the work zone, the work zone loading profile having a work zone cut angle relative to a ground reference; and
selecting a final cut loading profile for a final cut location along the path adjacent the boundary zone, the final cut loading profile having a final cut angle relative to the ground reference, the final cut angle being steeper than the work zone cut angle.

13. The method of claim 12, further including selecting a boundary zone loading profile for a boundary zone cut location along the path within the boundary zone, the boundary zone loading profile having a boundary zone cut angle relative to the ground reference, and the boundary zone cut angle being steeper than the work zone cut angle.

14. The method of claim 13, wherein the final cut angle is steeper than the boundary zone cut angle.

15. The method of claim 12, further including selecting a boundary zone loading profile for a boundary zone cut location along the path within the boundary zone, the boundary zone loading profile having a boundary zone cut angle relative to the ground reference, the boundary zone loading profile having a boundary zone cut depth equal to a distance between the work surface and the carry surface at the boundary zone cut location, the work zone loading profile having a work zone cut depth equal to a distance between the work surface and the carry surface at the work zone cut location, and the final cut loading profile having a final cut depth equal to a distance between the work surface and the carry surface at the final cut location, the boundary zone cut angle, the work zone cut angle, and the final cut angle being linearly proportional to the boundary zone cut depth, the work zone cut depth, and the final cut depth, respectively.

16. The method of claim 12, further including generating a boundary zone loading profile for each of a plurality of boundary zone cut locations along the path within the boundary zone, each boundary zone loading profile including a boundary zone cut angle relative to the ground reference, and the boundary zone cut angle of each boundary zone loading profile being steeper than the boundary zone cut angle of any boundary zone loading profile corresponding to a boundary zone cut location closer to the work zone.

17. The method of claim 12, further including generating a boundary zone loading profile for each of a plurality of boundary zone cut locations along the path within the boundary zone, each boundary zone loading profile including a boundary zone cut angle relative to the ground reference, and the boundary zone cut angles being progressively steeper closer to the boundary.

18. The method of claim 12, further including generating an alert command upon a final cut depth exceeding a work zone cut depth by a predetermined height.

19. The method of claim 12, wherein the machine includes a prime mover, a ground-engaging drive mechanism, and a transmission operatively connected between the prime mover and the ground-engaging drive mechanism, the transmission including a first reverse gear and a second reverse gear, the first reverse gear having a higher gear ratio than the second reverse gear, and further including moving the ground-engaging work implement along the final cut loading profile along a slope too steep for the machine to climb while operating with the transmission in the second reverse gear.

20. A machine, comprising:
a prime mover;
a ground-engaging work implement for engaging a work surface along a path at a work site;
a position sensor for generating position signals indicative of a position of a work surface at the work site;
a controller configured to:
store an electronic map of the work site, the work site including a boundary, a work zone, and a boundary zone between the boundary and the work zone;
store a target surface;
determine the position of the work surface based upon the position signals;

select a work zone loading profile for a work zone cut location along the path within the work zone, the work zone loading profile having a work zone cut angle relative to a ground reference;

select a final cut loading profile for a final cut location along the path adjacent the boundary zone, the final cut loading profile having a final cut angle relative to the ground reference, the final cut angle being steeper than the work zone cut angle.

* * * * *